United States Patent
Battista et al.

(10) Patent No.: US 9,704,399 B2
(45) Date of Patent: *Jul. 11, 2017

(54) SYSTEM AND METHOD FOR ADAPTIVE MOTION SENSING WITH LOCATION DETERMINATION

(71) Applicant: SkyBitz, Inc., Herndon, VA (US)

(72) Inventors: Rich Battista, Ashburn, VA (US); Jianming Yuan, Boyds, MD (US)

(73) Assignee: SkyBitz, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,684

(22) Filed: Sep. 4, 2015

(65) Prior Publication Data
US 2016/0071414 A1    Mar. 10, 2016

Related U.S. Application Data

(63) Continuation of application No. 13/052,433, filed on Mar. 21, 2011, now Pat. No. 9,128,179, which is a continuation of application No. 12/349,031, filed on Jan. 6, 2009, now Pat. No. 7,911,329, which is a continuation of application No. 11/377,653, filed on Mar. 17, 2006, now Pat. No. 7,486,174.

(60) Provisional application No. 60/715,592, filed on Sep. 12, 2005, provisional application No. 60/750,791, filed on Dec. 16, 2005.

(51) Int. Cl.
G08G 1/123    (2006.01)
G01S 19/34    (2010.01)
G08G 1/00     (2006.01)
H04W 4/02     (2009.01)

(52) U.S. Cl.
CPC .............. *G08G 1/123* (2013.01); *G01S 19/34* (2013.01); *G08G 1/20* (2013.01); *H04W 4/02* (2013.01)

(58) Field of Classification Search
CPC .......... G08G 1/123; G08G 1/20; G01S 19/34; H04W 4/02
USPC ......................................................... 340/988
See application file for complete search history.

(56) References Cited

U.S. PATENT DOCUMENTS

| | | |
|---|---|---|
| 4,740,792 A | 4/1988 | Sagey et al. |
| 5,491,486 A | 2/1996 | Welles, II et al. |
| 5,550,551 A | 8/1996 | Alesio |
| 5,955,986 A | 9/1999 | Sullivan |
| 6,067,044 A | 5/2000 | Whelan et al. |
| 6,094,162 A | 7/2000 | Sullivan |
| 6,154,171 A | 11/2000 | Sullivan |
| 6,169,514 B1 | 1/2001 | Sullivan |
| 6,211,907 B1 | 4/2001 | Scaman et al. |
| 6,243,648 B1 | 6/2001 | Kilfeather et al. |
| 6,313,786 B1 | 11/2001 | Sheynblat et al. |
| 6,313,791 B1 | 11/2001 | Klanke |

(Continued)

FOREIGN PATENT DOCUMENTS

EP    0194063 A2    9/1986

OTHER PUBLICATIONS

International Search Report and Written Opinion, PCT/US06/35240 Apr. 26, 2007.

*Primary Examiner* — Kerri McNally
(74) *Attorney, Agent, or Firm* — Toering Patents PLLC

(57) ABSTRACT

A system and method for adaptive motion sensing with location determination is described. In one embodiment, the adaptive motion sensor is based on vibration sensor readings and can identify different states of motions based on modifiable parameters.

20 Claims, 11 Drawing Sheets

(56) References Cited

U.S. PATENT DOCUMENTS

| | | |
|---|---|---|
| 6,317,060 B1 | 11/2001 | Jones |
| 6,408,178 B1 | 6/2002 | Wickstrom et al. |
| 6,411,891 B1 | 6/2002 | Jones |
| 6,480,788 B2 | 11/2002 | Kilfeather et al. |
| 6,519,529 B2 | 2/2003 | Doyle |
| 6,560,536 B1 | 5/2003 | Sullivan et al. |
| 6,697,735 B2 | 2/2004 | Doyle |
| 6,700,533 B1 | 3/2004 | Werb et al. |
| 6,721,652 B1 | 4/2004 | Sanqunetti |
| 6,725,158 B1 | 4/2004 | Kilfeather et al. |
| 6,748,318 B1 | 6/2004 | Jones |
| 6,748,320 B2 | 6/2004 | Jones |
| 6,801,853 B2 | 10/2004 | Workman |
| 6,832,153 B2 | 12/2004 | Thayer et al. |
| 6,904,359 B2 | 6/2005 | Jones |
| 6,919,803 B2 | 7/2005 | Breed |
| 6,920,391 B2 | 7/2005 | Daubert et al. |
| 6,934,625 B2 | 8/2005 | Haddad |
| 6,982,656 B1 | 1/2006 | Coppinger et al. |
| 6,983,202 B2 | 1/2006 | Sanqunetti |
| 7,096,116 B2 | 8/2006 | Tanaka et al. |
| 7,218,227 B2 | 5/2007 | Davis et al. |
| 7,486,174 B2 | 2/2009 | Battista |
| 7,498,925 B2 | 3/2009 | Battista |
| 7,804,394 B2 | 9/2010 | Battista |
| 2002/0014978 A1 | 2/2002 | Flick |
| 2002/0146296 A1 | 10/2002 | Schmitz et al. |
| 2002/0164993 A1 | 11/2002 | Elliot |
| 2002/0190873 A1 | 12/2002 | Flick |
| 2003/0210143 A1 | 11/2003 | Haddad |
| 2004/0178955 A1 | 9/2004 | Menache et al. |
| 2004/0183673 A1 | 9/2004 | Nageli |
| 2004/0225467 A1* | 11/2004 | Vock .................. A63C 5/06 702/142 |
| 2005/0159883 A1 | 7/2005 | Humphries et al. |
| 2005/0174235 A1* | 8/2005 | Davis .................. G06Q 10/08 340/539.13 |
| 2005/0192741 A1 | 9/2005 | Nichols et al. |
| 2005/0202830 A1 | 9/2005 | Sudit |
| 2005/0205719 A1 | 9/2005 | Hendrickson et al. |
| 2005/0253703 A1 | 11/2005 | He et al. |

\* cited by examiner

SYSTEM AND METHOD FOR ADAPTIVE MOTION SENSING WITH LOCATION DETERMINATION

This application is a continuation of non-provisional patent application Ser. No. 13/052,433 (Now U.S. Pat. No. 9,128,179), filed Mar. 21, 2011, which is a continuation of non-provisional patent application Ser. No. 12/349,031 (Now U.S. Pat. No. 7,911,329), filed Jan. 6, 2009, which is a continuation of non-provisional patent application Ser. No. 11/377,653 (Now U.S. Pat. No. 7,486,174), filed Mar. 17, 2006. Non-provisional application Ser. No. 11/377,653 claims priority to provisional application no. 60/715,592, filed Sep. 12, 2005, and provisional application no. 60/750,791, filed Dec. 16, 2005. Each of the above-identified applications is incorporated herein by reference in its entirety.

BACKGROUND

Field of the Invention

The present invention relates generally to monitoring and tracking and, more particularly, to a system and method for adaptive motion sensing with location determination.

Introduction

Tracking mobile assets represents a growing enterprise as companies seek increased visibility into the status of a service fleet (e.g., long-haul delivery fleet). Visibility into the status of a service fleet can be gained through mobile terminals that are affixed to service vehicles. These mobile terminals can be designed to generate position information that can be used to update status reports that are provided to customer representatives.

In generating status reports to a centralized facility, the mobile terminal can generate position information through the reception of satellite position signals such as that generated by the GPS satellite network. Processing these GPS signals, generating position information, and transmitting status reports to the centralized facility comes at the expense of the power requirements at the mobile terminal. Here, an increased number of reporting cycles reduces the effective battery life of the mobile terminal, thereby increasing the maintenance and field costs of the mobile terminals. Thus, what is needed is a system and method for increasing visibility into the mobile assets, while maintaining a reasonable battery life of the mobile terminal.

SUMMARY

The present invention meets the above-mentioned needs by providing an adaptive motion sensor system on a transport vehicle. In one embodiment, the adaptive motion sensor is based on vibration sensor readings and can identify different states of motion based on modifiable parameters.

Additional features and advantages of the invention will be set forth in the description which follows, and in part will become more fully apparent from the following description and appended claims, or may be learned by practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
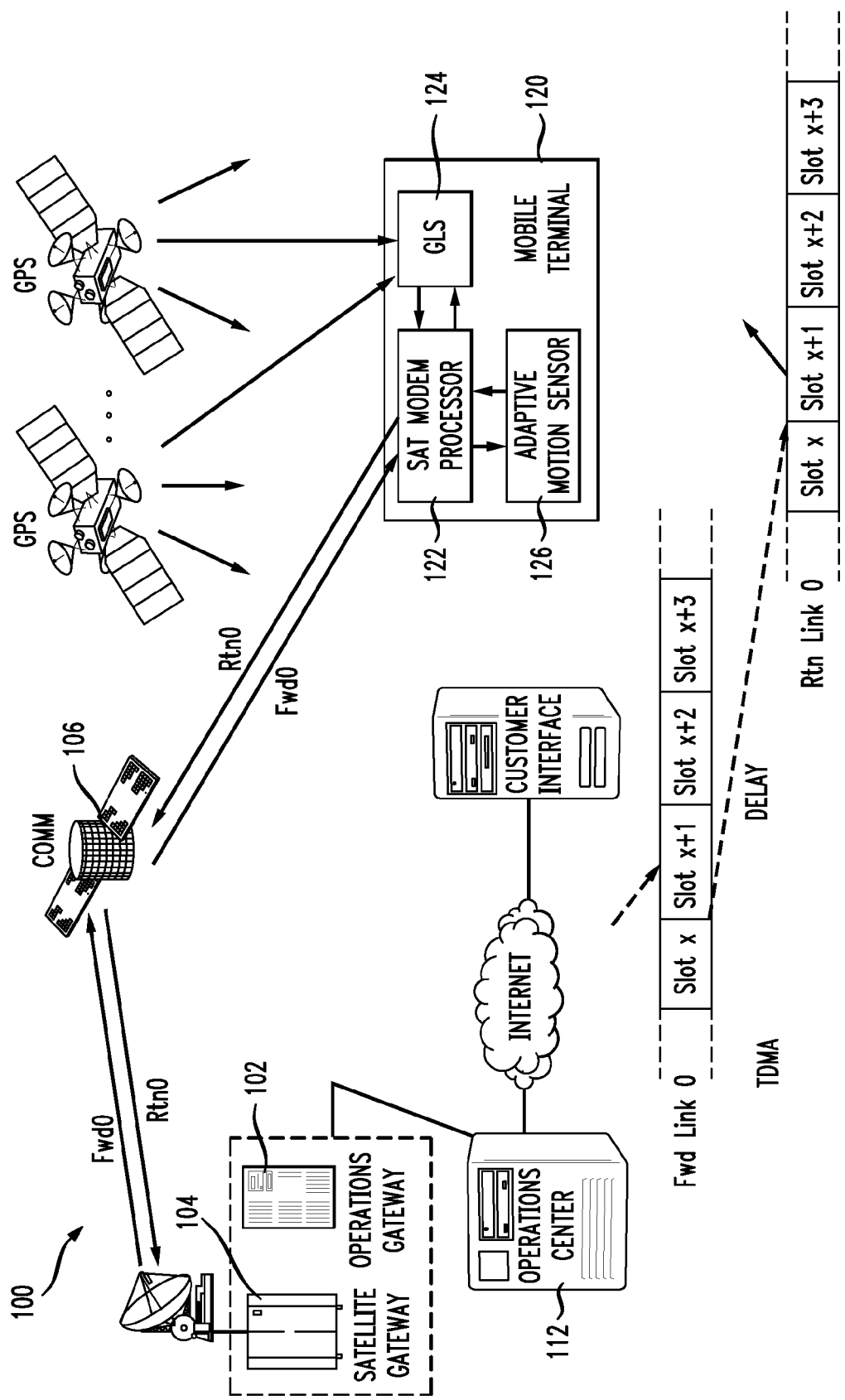
FIG. 1 illustrates an embodiment of a satellite network in communication with a mobile terminal.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In accordance with the present invention, a system and method is provided that enables the acquisition and sending of asset position information, start times, and stop times on an on-demand or event driven basis. One example of an event is when a mobile asset either starts or stops moving. It is a feature of the present invention that this tracking mechanism provides the most useful and valuable information about the movement of an asset to the customer, and at the same time minimizes the amount of power and bandwidth required, thereby reducing cost and extending battery life of the mobile terminal.

To appreciate the advantages of the present invention, it should be recognized that there is a difference between "data" and "information". Data is used to send information. Data can therefore be sent with or without any information in it. Energy or power is required to collect data. Bandwidth and cost is required to send data over a medium such as a satellite network. Ideally, data is collected and sent only when it contains information.

For asset tracking, the information can include the change of position and the time in which it occurred. If a position does not change, there is no new information, and no need to collect and send more data. One example of this is when a trailer is parked for three weeks in a yard. Here, a regularly scheduled reporting rate of once per day will have one report with information, and 20 reports with redundant data (or no information) since the position or stop time hasn't changed. This example illustrates a tremendous waste of power, bandwidth and cost. This waste can be eliminated by detecting a stop event, then collecting and sending position and stop-time information a single time. There is no need to collect and send data again until the position changes or the asset starts moving. When the asset does start moving, the position changes and new information can then be sent.

While moving, the position continually changes, and the need for position reports can drive the frequency of further updates. Many long-haul fleets are interested in pickup and delivery only, and not location in route. If position information is desired in route, the asset can either be paged for position, or can be given a temporary scheduled reporting rate (e.g., every 2 hours) over-the-air to leave a trail to track the asset in route. When the asset stops, the temporary scheduled reporting rate can be removed or lowered.

The quality of service from on-demand reporting is superior to conventional once per day reporting. The problem with once-per-day reports is that the information can be almost 24 hours old when it is retrieved. Typically, customers want reports around the same time of day or during "prime time." Prime time for dispatch trailer tracking is in the morning between the hours of 4 AM to 10 AM. When dispatchers or other users arrive at work in the morning, they want a recent position of where the trailers are, typically within a few hours. Like other networks, including cellular phone networks, everyone cannot use the network at the same time. Either the users accept older positions, or the service company expands the size of the network, which becomes very cost ineffective. The solution to satisfy the user and the service company is to use on-demand reporting.

With on-demand reporting, the user is satisfied because at any time of day, morning or night, they can know where their trailers are within minutes most of the time. This results because trailers are stopped most of the time, much more than they are moving. When a dispatcher looks at the position of an asset that stopped two weeks ago, they immediately know where it is at the moment they look. That's because it is stopped. Otherwise, if it moved from that location, it would have sent an event indicating it started to move. In the case where the asset is moving when an inquiry is made, the position could be hours old or as long as the unit keeps moving without stopping. If a two-hour reporting rate is applied while moving, then the dispatcher knows where the asset is within two hours, and on average, within 1 hour. This is far superior then once per day position reporting.

To the service provider, on-demand service is easier to provide than scheduled reporting during prime time. This is based on the fact that most long-haul trucking companies operate at all times of the day, where their assets start and stop at all different times of day, and subsequently, position and start/stop time information will be sent at all different times of day, spreading the network usage out over the whole day and not just during prime time. Even with companies that operate in the daytime, the network usage will still be spread, and utilized more efficiently than scheduled reporting.

In accordance with the present invention, the mobile terminal of the present invention includes an adaptive motion sensor that is used to detect movement of assets and initiate GPS signal measurements for position determination. The adaptive motion sensor also aids in the determination of arrival and departure times.

In one embodiment, the adaptive motion sensor is an independent processing unit within the mobile terminal and is capable of implementing adaptive processing in software. This adaptive processing automatically adjusts thresholds used to determine whether an asset is moving or not moving. Normally these thresholds are fixed and require manual adjustment for different asset types since each asset type has different characteristics (e.g., levels of vibration) while it is in motion. For example, truck trailers ride rougher and vibrate at higher levels as compared to cars, which ride smoother and vibrate at lower levels. Cars would therefore require a lower threshold than the truck trailer to detect the vibration.

In one vibration sensor embodiment, three valid states can be defined: (1) no vibration where the engine is off and no movement; (2) engine on but no movement; and (3) engine on and movement. The adaptive processing can collect and process vibration data to determine the levels of vibration for each state and automatically adjust a threshold to determine whether the asset is moving or not. Automatically or adaptively determining this threshold alleviates a large amount of effort required to determine this threshold manually. Not only will this reduce effort and cost and make the use of motion sensors more scalable, but it will also improve the reliability and performance of the motion detection processing since it can find the optimum thresholds automatically.

Prior to describing the details of a mobile terminal incorporating an adaptive motion sensor system, a description of an embodiment of an operational context in which the mobile terminal can operate is first provided. FIG. 1 illustrates an embodiment of a satellite network that includes operations gateway 102, communicating with satellite gateway 104, and has one forward and one return link (frequency) over satellite 106 to mobile terminal 120 located on the asset. The satellite waveform is implemented in the Time Division Multiple Access (TDMA) structure, which consists of 57600 time slots each day, per frequency or link, where each slot is 1.5 seconds long. On the forward link, operations gateway 102 sends a message or packet to mobile terminal 120 on one of the 1.5 second slots to give instructions to global locating system (GLS) component 124 via satellite modem processor 122. One example is to instruct GLS component 124 to perform a GPS collection (e.g., code phase measurements) and transmit the data back to operations gateway 102. When GLS component 124 of mobile terminal 120 receives this forward command, it collects the GPS information and transmits the data back on the return link, on the same slot, delayed by a fixed time defined by the network. The delay is needed to decode the forward packet, perform the GPS collect and processing, and build and transmit the return packet.

From there, operations gateway 102 passes the information to operation center 112, where the information is used to solve for position and present the position information to the customer via the internet. A detailed description of this process is provided in U.S. Pat. No. 6,725,158, entitled "System and Method for Fast Acquisition Position Reporting Using Communication Satellite Range Measurement," which incorporated herein by reference in its entirety.

It should be noted that the principles of the present invention can also be applied to other satellite-based or terrestrial-based location determination systems where the position is determined at the mobile terminal independently, or at the mobile terminal in combination with information received from another location.

As illustrated in FIG. 1, mobile terminal 120 also includes adaptive motion sensor 126. The main task of adaptive motion sensor 126 is to determine whether an asset is moving or not. From there, together with the mobile terminal processor (not shown) and GLS component 124 it can determine the arrival and departure times and locations of an asset. When an asset begins to move, the adaptive motion sensor 126 detects the motion or vibration and sends a signal to the mobile terminal processor informing it that motion has started. The mobile terminal processor then records the time motion started, and signals to GLS component 124 to collect code phase. The start time and the codephase are sent over the satellite back to operations gateway 102 and operation center 112 where the codephase is used to solve for position, and the start time is used to generate the departure time. Conversely, when adaptive motion sensor 126 determines motion has stopped it will again inform the mobile terminal processor to collect time and codephase, and send the information back to operations gateway 102. Operation center 112 solves for position, and the stop time is used to generate the arrival time. The arrival and departure times along with their locations can be supplied to the user via the Internet. As noted, in an alternative embodiment, the mobile terminal could send a position determined at the mobile terminal back to operations center 112.

In one embodiment, adaptive motion sensor 126 has a layer of filtering that is capable of filtering out unwanted starts and stops and only transmits true arrival and departure information. Adaptive motion sensor 126 can be configured to only transmit starts or stops when the change in motion is maintained for a configurable percentage of time. In this manner, only accurate arrival and departure time information is transmitted using the mobile terminal with the adaptive motion sensor. This layer of filtering saves on unwanted transmissions, and hence power, bandwidth, and cost.

In one embodiment, mobile terminal 120 is configured to transmit a position report after the actual arrival or departure times when the motion sensor has reached its "no-motion" or "motion" times, respectively. The "motion" and "no-motion" times can be separately configurable, for example, from one minute up to two hours. This configurability can be used to allow more time to exit an area of interest, or allow more time at rest stops along the way.

In one embodiment, the user-configurable "motion sensitivity" can be implemented as the percentage of time the asset needs to remain in motion during the "motion time" to signal motion. This is useful, for example, in maintaining a motion condition while stopped at a traffic light or a rest stop. Conversely, the user-configurable "no-motion sensitivity" can be implemented as the percentage of time the asset needs to remain in no-motion during the "no-motion" time to signal no-motion. This is useful, for example, in maintaining a no-motion condition while moving a trailer within a yard.

Figure 2A:
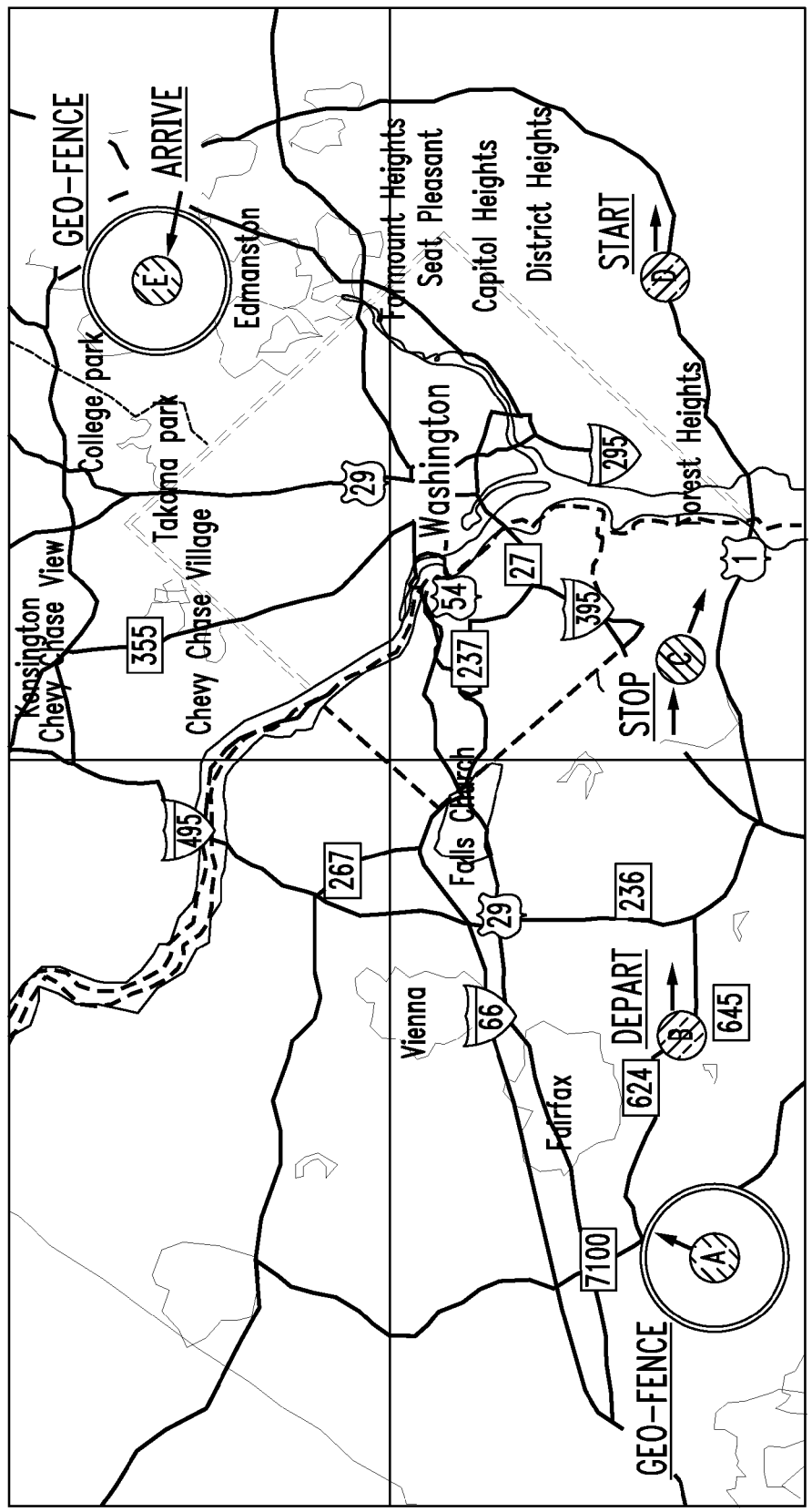
FIGS. 2A and 2B illustrate an example of a timeline of status reports generated by a moving asset.
Figure 2B:
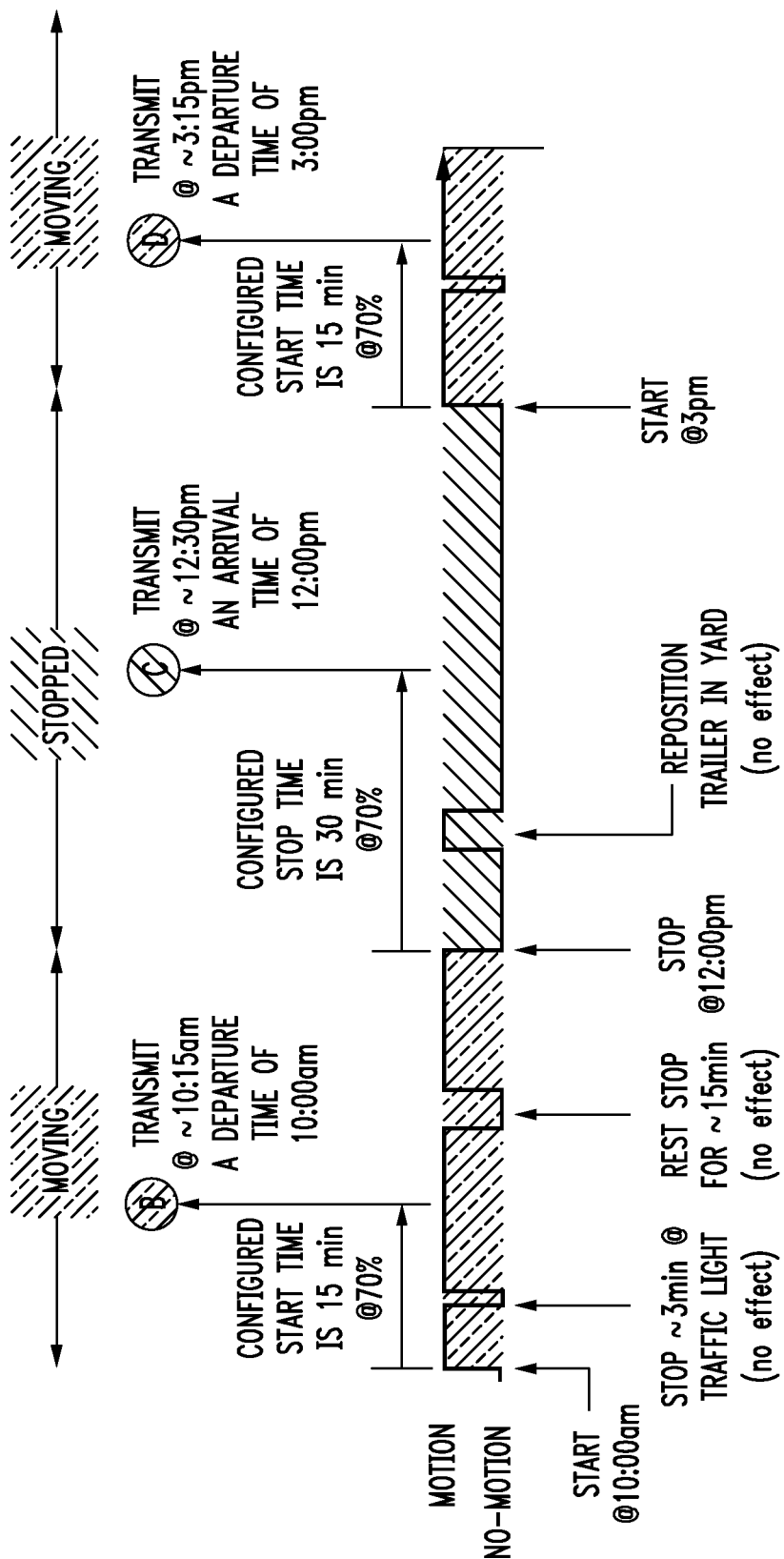

FIGS. 2A and 2B illustrate an example of a timeline of a unit moving from point A to point E, and stopping in between. In this example, two states are used for the adaptive motion sensor: motion and no-motion. The user-configurable motion time is set at 15 minutes, while the user-configurable motion sensitivity is set at 70%. The user-configurable no-motion time is set at 30 minutes, while the user-configurable no-motion sensitivity is set at 70%.

The timeline begins at 10 AM when the asset begins to leave a yard at point A on its trip to point E. When the adaptive motion sensor determines a transition to the motion state, it records the time of 10 AM. The asset then stops at a traffic light between point A and point B for three minutes. During this time, the adaptive motion sensor determines that the asset is in a no-motion condition for those three minutes. It should be noted that even with the existence of the motion condition prior to the traffic light stop, the mobile terminal does not report that the asset has departed point A. This results because the user-configurable motion time has been set at 15 minutes. Thus, the motion time threshold has not yet been reached. When the 15-minute motion time has expired, the mobile terminal then determines whether the user-configurable motion sensitivity has been satisfied. With a motion sensitivity of 70%, the asset would need to maintain a motion condition for at least 70% of the 15 minutes, or 10.5 minutes. In this example, the asset has maintained a motion condition for 12 of the 15 minutes, therefore satisfying the motion sensitivity threshold. With both the time and sensitivity thresholds being met, the mobile terminal then transmits a message to the operations center that the asset has departed point A at 10 AM. The time of transmission is illustrated as point B. Here, it should be noted that the time reported (i.e., 10 AM) is not the same as the time of the report (i.e., 10:15 AM).

After the transmission at point B, the asset stops at a rest stop for 15 minutes. This 15-minute stop does not trigger an arrival message because it has not met the user-configurable no-motion time and sensitivity parameters of 30 minutes and 70%, respectively. Specifically, the 15-minute stop has not met the 21 minute (i.e., 70% of 30 minutes) threshold dictated by the user-configurable no-motion parameters.

At 12 AM the asset stops at point C in a yard. Even with the repositioning of the asset within the yard for about 5 minutes, the adaptive motion sensor determines that the asset has maintained a no-motion condition for more than 70% of the 30 minutes. At the expiration of the no-motion time, the mobile terminal then transmits a message at 12:30 AM indicating that the asset had stopped at 12 AM.

At 3 PM, the adaptive motion sensor determines that the asset has entered a motion condition as the asset resumes its journey. At 3:15 PM, the user-configurable motion time and sensitivity parameters are met and the mobile terminal then transmits a message at 3:15 PM indicating that the asset has departed at 3 PM.

This process continues as the asset continues on to point E. Throughout this process, the mobile terminal transmits start and stop messages only when the user-configurable time and sensitivity parameters are met. In one embodiment, the mobile terminal can also be configured to periodically transmit status reports (e.g., once per hour) when in a motion condition. These periodic status reports would enable the system to track the asset while en route.

Arrival times, departures times, and code phase collections are initiated by the adaptive motion sensor when the asset starts and stops moving. In one embodiment, detection of when an asset starts and stops moving is based on the change in measurable vibration on the asset that is caused when an asset starts or stops moving. The adaptive motion sensor can therefore be designed to measure the amount of vibration or acceleration to determine movement. Complications can arise when vibration or acceleration is caused by other extraneous factors such as an engine running, or a compressor or refrigeration unit running. The vibration from the other sources can be detected by the sensor and can cause false indications. The adaptive motion sensor can be designed to differentiate between vibration resulting from true movement and vibration resulting from extraneous sources. If it is assumed that movement must come from a vehicle, and that the vehicle cannot move unless an engine is running, then three states of motion can be defined: (1) engine off, no movement; (2) engine on, no movement; and (3) engine on, moving. There are other possible states such as engine off and movement, but not valid. Also, state (2) may in fact have two or more individual states from separate engines or motors such as refrigeration units and compressors.

For simplicity, vibration from one or more engines can be treated as one state. These three states will produce three distinct levels of vibration in which the motion sensor can use to determine movement. To determine these states the adaptive motion sensor can collect and process data from a vibration sensor.

Figure 3:
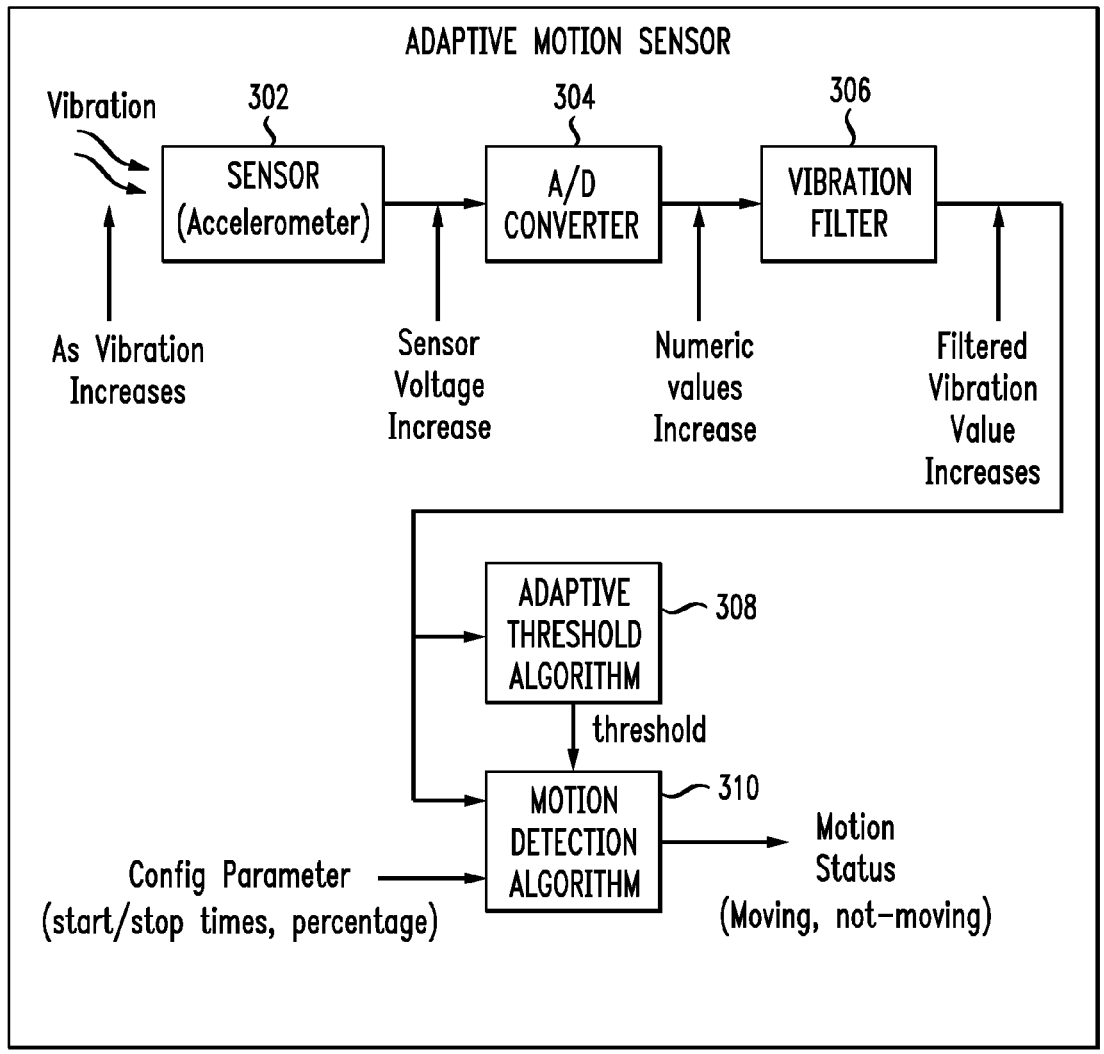
FIG. 3 illustrates an embodiment of an adaptive motion sensor system.

FIG. 3 illustrates an embodiment of a system that converts vibration into a usable filtered number, which can be used to determine the state of motion (e.g., moving or not-moving). In one embodiment, vibration sensor 302 produces a voltage that is proportional to the amount of acceleration or vibration. One such device is an accelerometer-based MEMS (Micro-Electro-Mechanical System) device, which can detect acceleration in two or three axis. For detecting vibration, 2-axis is usually adequate.

Figure 4:
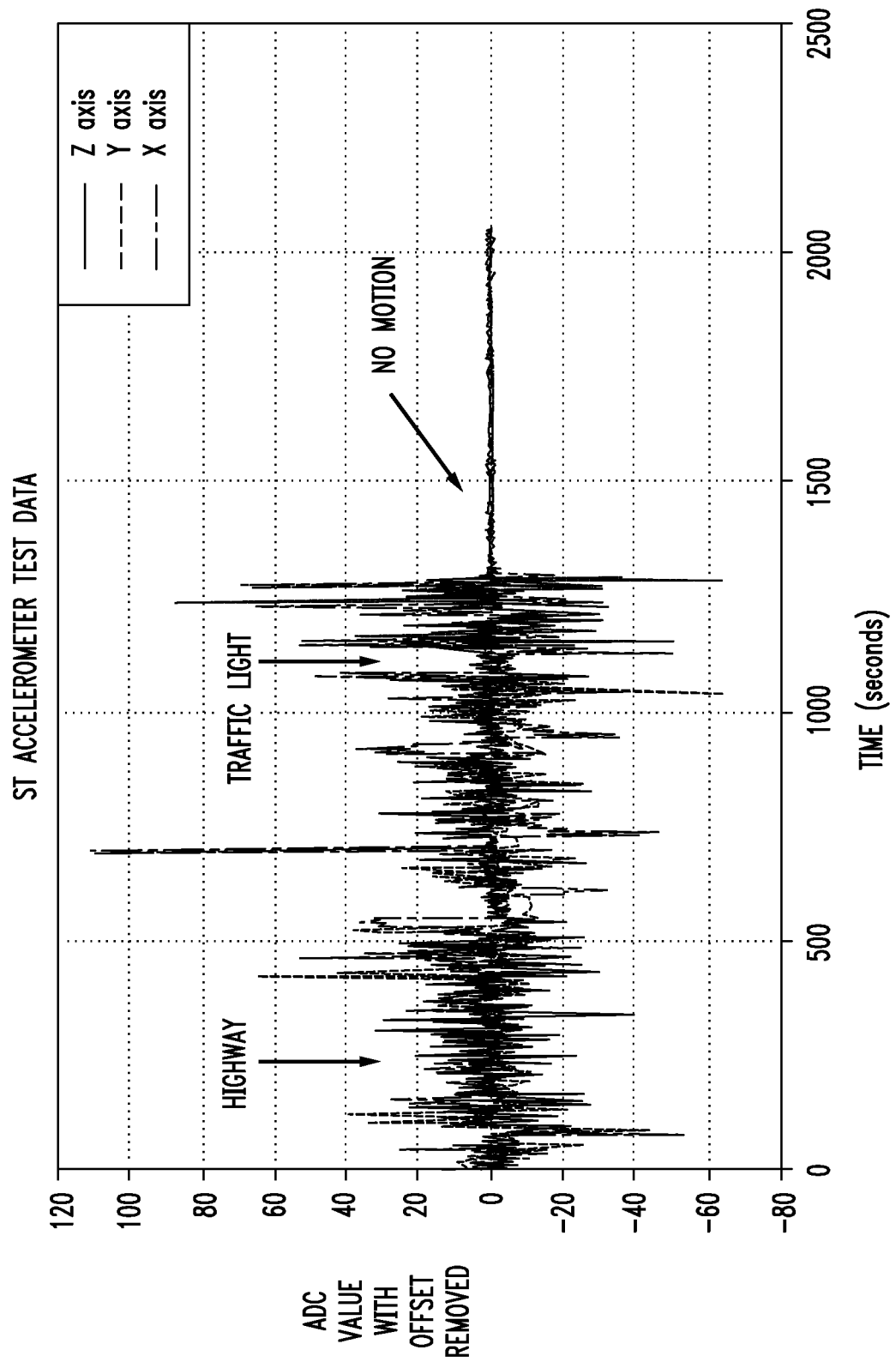
FIG. 4 illustrates an example of accelerometer data.

Voltage from the accelerometer is then fed into A/D converter 304. The output of A/D converter 304 produces a number that is proportional to the amount of acceleration or vibration measured by sensor 302. A low-speed A/D converter can be used to convert a low-bandwidth (e.g., less than 50 hz) signal from an analog voltage to a digital value. The system can be designed to sample A/D converter 304 for a very short time at a very slow rate (e.g., measure for a few milliseconds every five seconds) to operate as an ultra-low power device. FIG. 4 shows example data from a three-axis (x, y and z) accelerometer on an asset through various states of movement from moving on the highway to no motion. The values shown are the difference or derivative from consecutive samples.

An accelerometer sensor detects acceleration on each of its axis including that caused by gravity. The result is a constant DC voltage from the axis that is affected by gravity. To detect acceleration only from vibration and not gravity, the difference or derivative is taken between consecutive samples to remove the DC values and the effect from gravity and tilting of the sensor.

Figure 5:
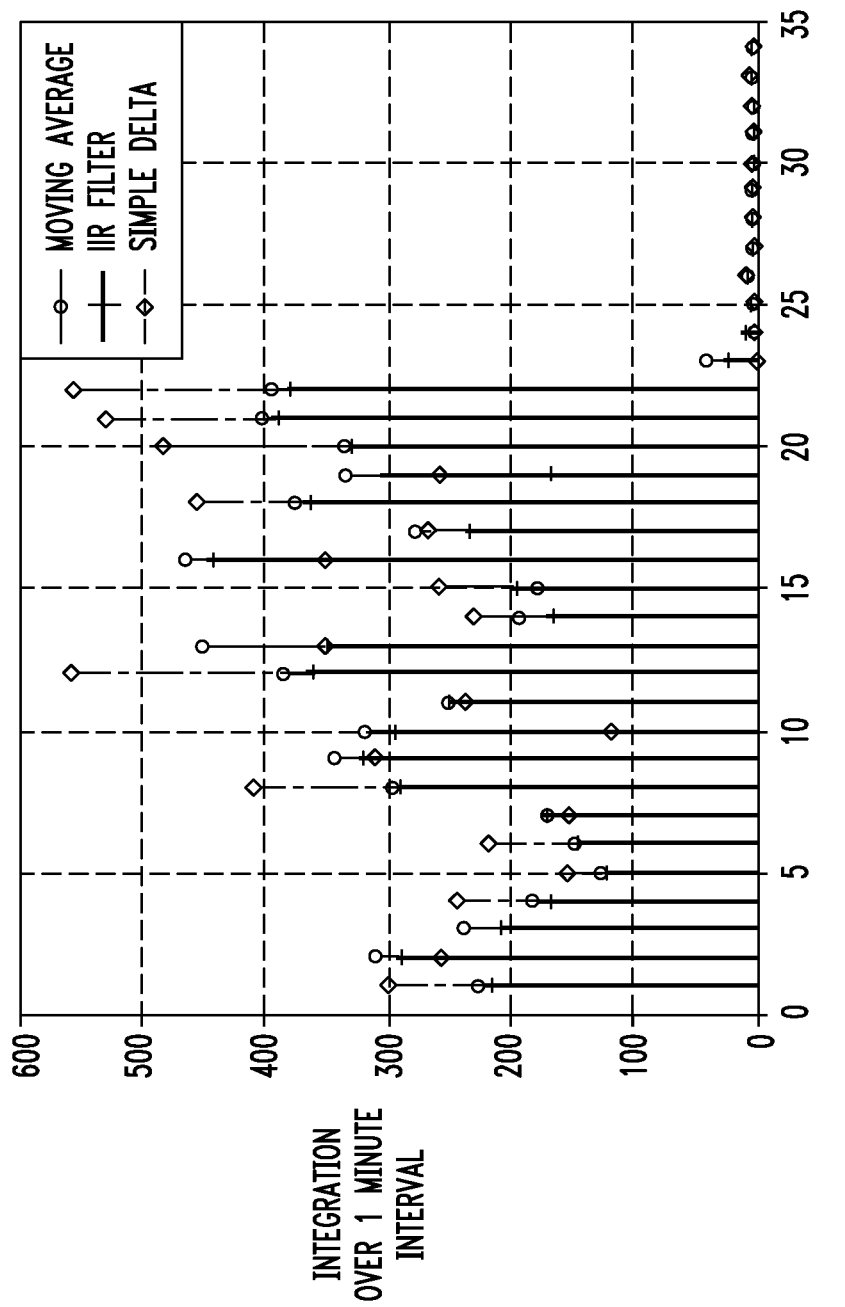
FIG. 5 illustrates results of filtering on raw accelerometer data.

Vibration filter 306 smoothes the readings produced by A/D converter 304 to reduce the variance from successive samples. Raw A/D samples are processed in vibration filter 306 to produce a smoother numeric value representing the level of vibration. In one embodiment, a sample is taken every five seconds on each axis of the accelerometer. The delta or difference between the new sample and the last sample is then taken from the corresponding axis. The deltas are integrated over six samples or every 30 seconds to produce the filtered vibration value. Integration of the delta over six samples has been found to have the most sensitivity to vibration over other means of filtering such as a moving filter or IIR filter. The chart in FIG. 5 shows the results from the different filtering techniques from the raw data shown in FIG. 4. The simple delta (in red) produced the largest and most usable filtered vibration values.

Filtered vibration values are fed into adaptive threshold stage 308 and motion detection stage 310. Based on the input configuration parameters, motion detection stage 310 performs a second level of filtering to determine the motion state. In one embodiment, a motion state does not change unless the new motion state is maintained for a configured percentage of time. This assists in filtering out momentary or temporary changes in motion state. Motion detection stage 310 compares the filtered vibration value at its input to a threshold to determine the current sampled motion state. If the new filtered vibration values are above the threshold, motion detection stage 310 interprets the new reading as "motion" and conversely, if below the threshold interprets the new reading as "no-motion." It will then process these new raw input values through the second stage filter to determine the current motion state.

Figure 6:
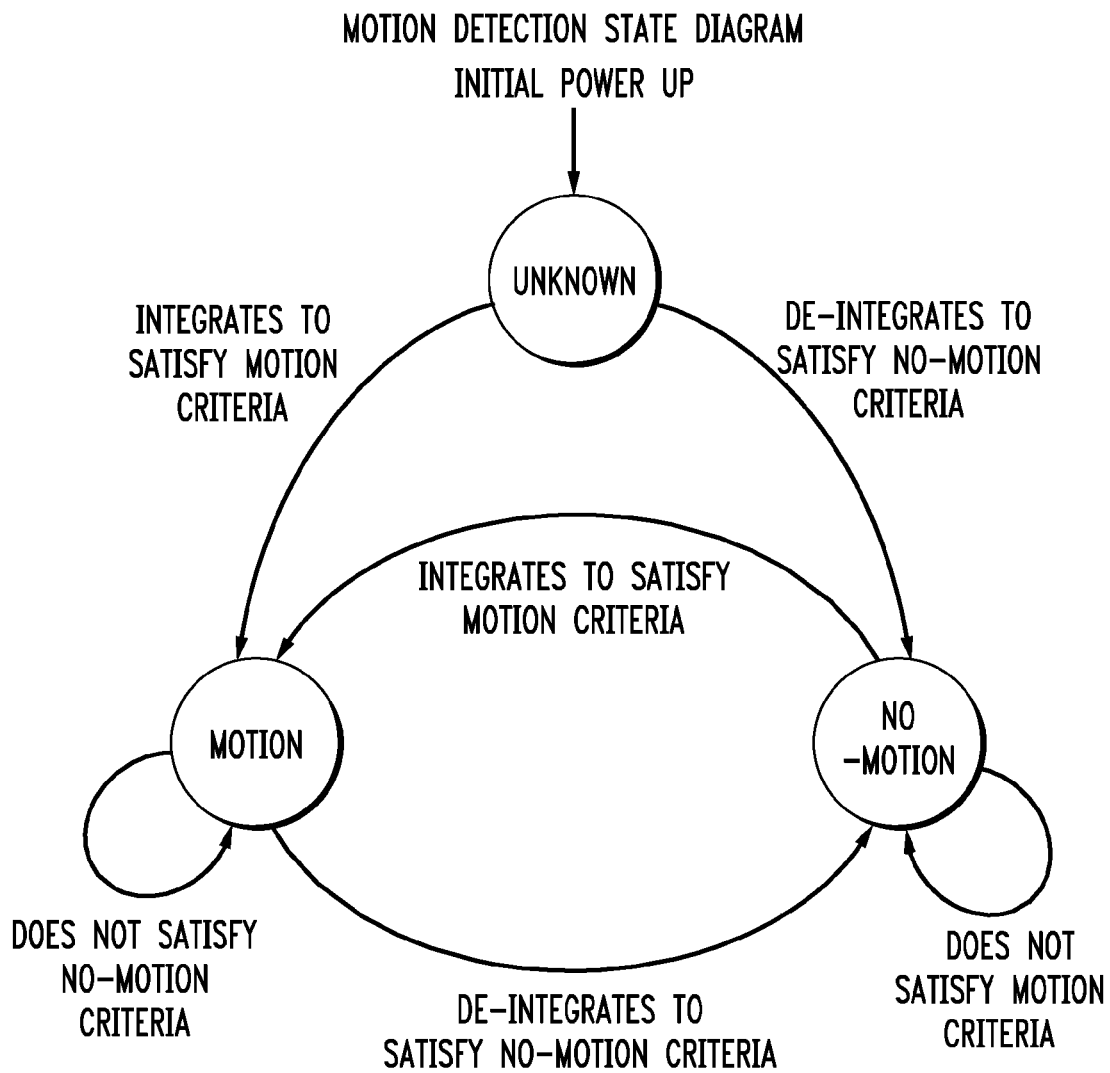
FIG. 6 illustrates an example of different motion states.

In one embodiment motion detection stage 310 is implemented in software, which uses the filtered vibration inputs to determine the current state of motion. FIG. 6 illustrates an example of the various states of motion detection stage 310.

On initial power up the motion detector is in an unknown state. The states are changed when motion detection stage 310 determines that criteria have been met for a motion or no-motion state. The criteria is based on the filtered vibration input value, the vibration threshold, the motion or no-motion times, and their corresponding percentage.

Figure 7:
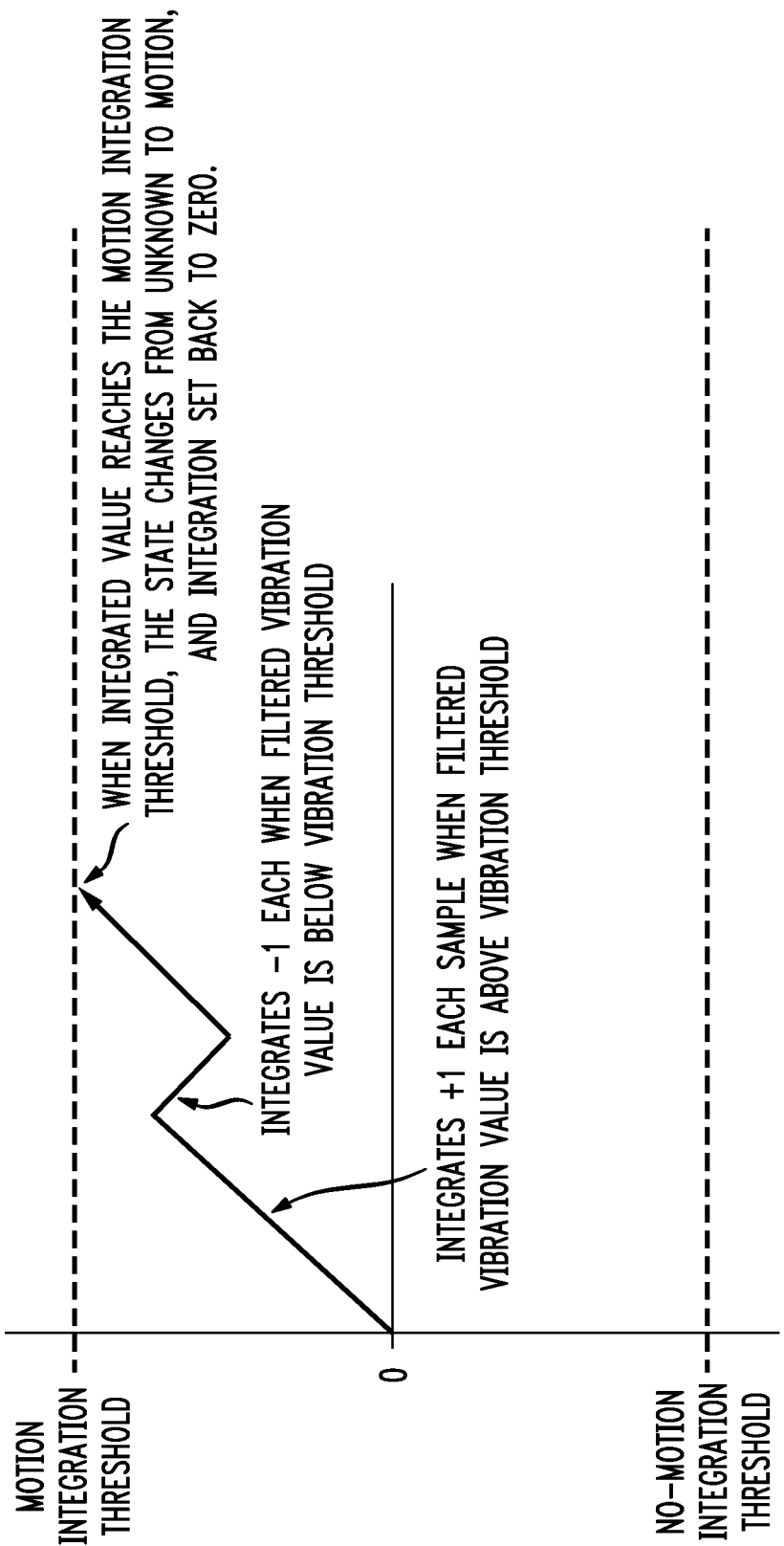
FIG. 7 illustrates an example of integration to a motion state.

To determine the current or next state, motion detection stage 310 samples the filtered vibration input value at a uniform rate and compares it to the vibration threshold. If the value is above the threshold it will add "+1" to a motion integrator. Conversely, if the value is below the vibration threshold, it will add "−1", or subtract 1 from the motion integrator. If the motion integrator integrates up to a positive threshold called the motion integration threshold, it changes the state to "motion". Conversely, if the motion integrator integrates down to a negative threshold called the no-motion integration threshold, it changes the state to "no-motion". From the "Unknown" state motion detection stage 310 integrates values until it reaches either the motion or no-motion integration threshold. FIG. 7 illustrates an example of integration to a motion state.

As noted, the motion or no-motion integration thresholds are based on a start time and stop time, and a start sensitivity and stop sensitivity, respectively. These over-the-air configurable parameters allow a user to specify what motion or no-motion means in their own particular context. For example, a user can specify that to change from a no-motion state to a motion state, the asset must be in motion (moving) for at least 15 minutes, 70% of the time. This means from the start of motion, the filtered vibration values must stay above the threshold for the next 15 minutes 70% of the time or for a total time of 15*0.7=10.5 minutes. This allows a unit to survive brief stops such as at a traffic light after it has truly started motion. For this example, when motion starts, a timer also starts. When the timer reaches 15 minutes, if the integrated value is above the threshold, the state will change to motion. The integrated value is only reached if the unit stayed in motion for a total of 10.5 minutes.

Adaptive threshold stage 308 inputs the same filtered vibration values as motion detection stage 310 to automatically adjust the threshold value to an optimum value for determining the difference between "motion" and "no-motion." Adaptive threshold stage 308 enhances the performance of motion detection stage 310 and eliminates the need for manual adjustment of the vibration threshold. This results because the vibration characteristics can vary from asset to asset in which the mobile terminal and the adaptive motion sensor are installed. Also, the sensors themselves, such as an accelerometer, can vary in sensitivity. For these reasons, the vibration threshold may need to be different for each sensor and asset for optimum performance. To avoid having to manually adjust thresholds, adaptive threshold stage 308 collects information about the vibration characteristics and uses this information to automatically adjust the vibration threshold to an optimum level for the particular sensor and asset.

As noted, in one embodiment, three valid states of motion for an asset can be defined: (1) engine off, no movement; (2) engine on, no movement; and (3) engine on, moving. Each of these three states produces three distinct levels of the filtered vibration values. Collected data can determine what these different levels are and can be used to adjust the vibration threshold. In one embodiment, the filtered vibration values are used to generate a histogram.

Figure 8:
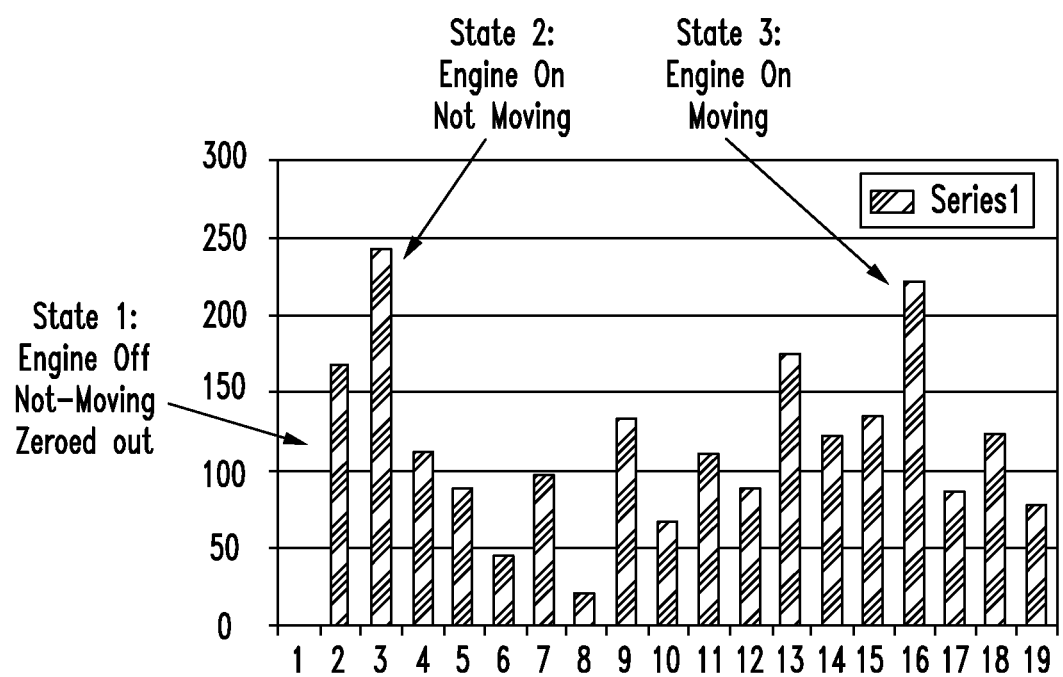
FIG. 8 illustrates an example of histogram data.

FIG. 8 illustrates an example of a histogram generated from the filtered vibration values from a motion sensor on an asset over a period of time in which the asset has had many starts and stops. State 1 data has been zeroed out since this data is not useful for adjusting the threshold. Also, this data would dominate the histogram since assets are typically not moving or stopped most of the time. Essentially, the two useful states for adjusting the threshold are states 2 and 3. To find the states that distinguish motion and no-motion, the peaks are identified from right to left, or from higher to lower vibration. This first peak from the right represents the average level of vibration for an asset in state 3 (i.e., moving with engine or engines on). The next lowest peak (to the left) in the histogram corresponds to state 2 (i.e., engine on, not moving). Ideally, the vibration threshold should lie at the null between the histogram peaks for states 2 and 3.

Figure 9:
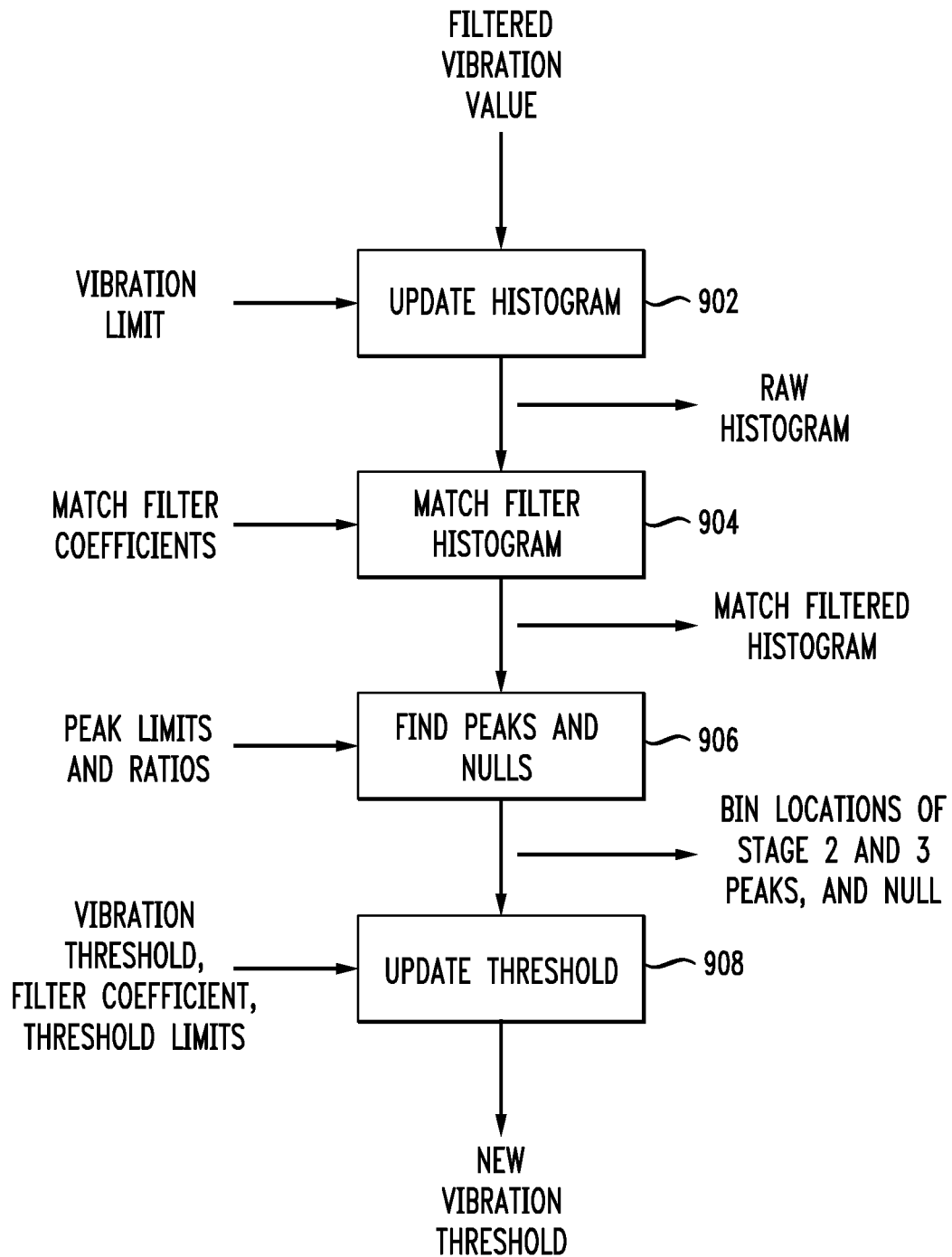
FIG. 9 illustrates a block diagram of an embodiment of an adaptive threshold process.

To find a good midpoint, the histogram is processed to find the peaks. FIG. 9 illustrates an embodiment of the adaptive threshold process. At step 902, the histogram is updated. Here, filtered vibration values have a fixed range based on the gain from the accelerometer sensor and the size of the A/D. The maximum established range of the filtered vibration values can then be divided into X number of ranges or bins of the histogram. As each filtered vibration value enters this stage, the corresponding bin or range is incremented. One bin is incremented for each new filtered vibration value. To prevent overflow, the histogram scans all bins for the highest peak. If an identified peak value is one increment away from the maximum numeric bin value (e.g. 255 for 8-bits), then all bins can be scaled down by two to prevent overflow. This essentially changes the histogram from an integrator to a recursive filter for each bin. This means that the histogram has a limited memory by retaining only the most recent values, and can change or evolve as vibration characteristic change or evolve.

Typically, assets and the adaptive motion sensor, are stopped most of the time or are in state 1. Most of the filtered vibration values fall in the lower bins of the histogram creating a large peak. Since this information is not useful for adjusting the threshold it is filtered out to prevent it from dominating the histogram. A configurable vibration limit can be used to specify the minimum filtered vibration that can be used in the histogram. By doing this the histogram will only contain data from state 2 and state 3. This data contains the information needed to adjust the vibration threshold.

At step 904, the histogram is match filtered. It should be noted, however, that before match filtering the raw histogram, there should be a sufficient amount of data in the histogram. The criteria to continue can be simply based on having a specified minimum number of data points available. For example, the sum of all the values in the histogram (energy) must exceed a specified minimum value. This is better than simply testing the max value of any bin.

Since the histogram may not have a smooth shape, some form of filtering (e.g., match filtering) can be used to help find the true peak. Match filters can work well when there is a know pattern in the presence of noise. The known pattern in this case is one caused by a constant vibration while in motion. This pattern will look like a bell curve where the center is the average vibration value. Momentary variations in vibration levels are cause by random positions from the sensor, and from changes from the source of vibration such as the road, the engine, etc. Over a long period of time the vibration levels should average out to a bell curve. The match filter coefficients can be modeled after the bell curve produced under constant vibration from motion over a long period of time.

Figure 10:
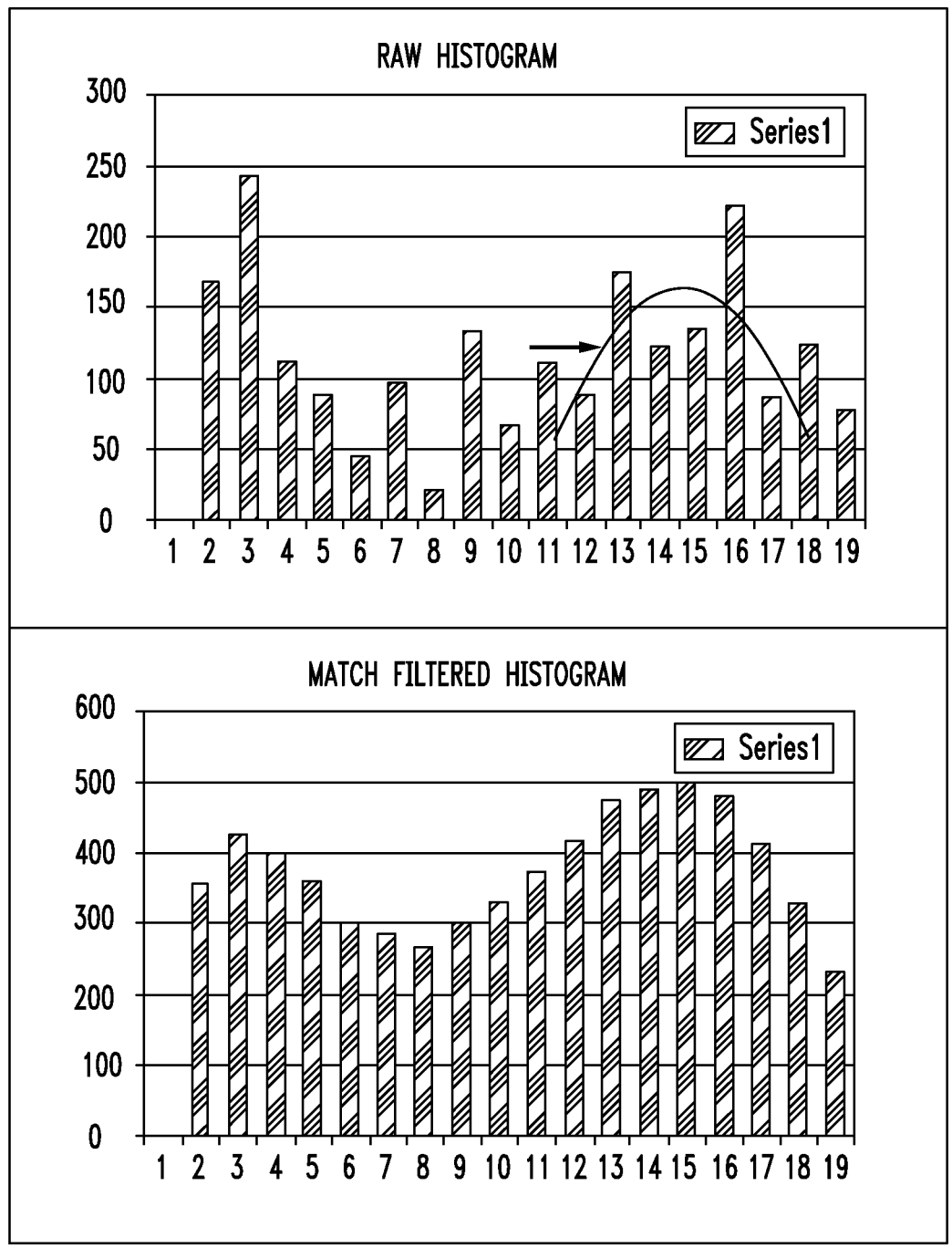
FIG. 10 illustrates an example of a match-filtered histogram.

FIG. 10 illustrates the raw histogram with the match-filtered version below. The idea here is to center the filter over each bin and multiply each point of the filter with each of the corresponding bins about the center to get the filtered point for that bin. The filter width can be limited to the significant information for each peak. The resulting match filtered output is smooth and should contain only one peak for each vibration state.

At step 906, the peaks and nulls are found. This stage processes the match-filtered histogram for the bin locations where the state 2 and state 3 peaks are located as well as the bin where the null or low point is between the two peaks. This information is sent to the next stage to adjust the vibration threshold to the ideal or optimum location at the null between the two peaks. The null is where both bell curves, one from state 2 (engine on, no movement) and one from state 3 (engine on, moving), overlap. This is the location where the threshold will have the highest probability of accurately distinguishing between moving and not-moving.

At step 908, the threshold is updated. For each iteration of the adaptive threshold process, the vibration threshold to motion detection stage 310 is updated. The new threshold uses the bin location of the null and the previous filtered value to produce the new value using an IIR filter. The bin location of the state 2 and state 3 peaks are not used to update the threshold, rather they are used to qualify the result to ensure it does not track to an erroneous value. The new threshold can be calculated using the following equation: $y(n)=k*y(n-1)+(1-k)*x(n)$ where, $0<=k<=1$, k is the IIR filter coefficient, $x(n)$ is the bin location of the null after processing a new match filtered histogram, $y(n-1)$ is the previous vibration threshold (in unit of bin numbers), and $y(n)$ is the new vibration threshold.

In one embodiment, before updating the vibration threshold, a series of qualification tests can be made using configurable parameters. Each of these checks or qualifiers should be passed in order to update the vibration threshold. In addition to the limits, each of these qualification tests can be enabled or disabled independently over-the-air to provide maximum flexibility in adjusting the algorithm over the air. A "Master Fail" bit will be set if any of these enabled qualifiers fail. This bit can be sent over the air to allow a quick tally of all units that are not operating under normal parameters. From there, the failing unit can be polled to extract the details of the failure which include which qualifier failed, the match filtered histogram, vibration threshold, etc. The intent of the qualifiers is to ensure that the adaptive threshold process produces a threshold that improves performance and does not degrade it. It is better to falsely fail a qualifier and stop threshold adjustments than to adjust a threshold based on incorrect data, and degrade performance.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system, comprising:
   a vibration sensor that detects vibrations from a transport vehicle;
   a motion detector configured to receive first input values based on first readings of the vibration sensor, to compare the received first input values to a first threshold value, and to determine that the transport vehicle is in a first operating state when one or more received first input values are above the first threshold value and to determine that the transport vehicle is in a second operating state when one or more received first input values are below the first threshold value; and
   an adaptive threshold adjuster configured to identify a second threshold value as a replacement for the first threshold value,
   wherein the motion detector is further configured to compare received second input values based on second readings of the vibration sensor to the second threshold value and to determine that the transport vehicle is in the first operating state when one or more received second input values are above the second threshold value and to determine that the transport vehicle is in the second operating state when one or more received second input values are below the second threshold value.

2. The system of claim 1, wherein the first operating state is an engine on with movement operating state and the second operating state is an engine on without movement operating state.

3. The system of claim 1, wherein the vibration sensor is an accelerometer based micro-electro-mechanical system.

4. The system of claim 1, further comprising an analog-to-digital converter coupled to the vibration sensor and a vibration filter that smoothes values produced by the analog-to-digital converter.

5. The system of claim 1, wherein the adaptive threshold adjuster identifies the second threshold value using the first input values based on the first readings of the vibration sensor.

6. The system of claim 1, wherein parameters of the adaptive threshold adjuster are configurable using data provided by external communication received by the system.

7. The system of claim 6, wherein the external communication is a satellite communication.

8. The system of claim 6, wherein the data provided by external communication controls one or more qualification tests that determine whether the adaptive threshold adjuster can update the first threshold value to the second threshold value.

9. The system of claim 8, wherein the data provided by external communications enables or disables the one or more qualification tests.

10. The system of claim 8, further comprising a transmitter that transmits information enabling indication of a failure of at least one of the one or more qualification tests.

11. The system of claim 1, wherein the transport vehicle is a tractor trailer.

12. A method, comprising:
   generating, by a vibration sensor, first vibration values based on first vibrations of a transport vehicle;
   comparing, by a detection component, the first vibration values to a first threshold value and determining that the transport vehicle is in a first operating state when one or more of the first vibration values are above the first threshold value and determining that the transport vehicle is in a second operating state when one or more of the first vibration values are below the first threshold value;
   identifying, by an adaptive threshold component, a second threshold value as a replacement for the first threshold value;
   generating, by the vibration sensor, second vibration values based on second vibrations of the transport vehicle; and
   comparing, by the detection component, the second vibration values to the second threshold value and determining that the transport vehicle is in the first operating state when one or more of the second vibration values are above the second threshold value and determining that the transport vehicle is in the second operating state when one or more of the second vibration values are below the second threshold value.

13. The method of claim 12, wherein the first operating state is an engine on with movement operating state and the second operating state is an engine on without movement operating state.

14. The method of claim 12, wherein the vibration sensor is an accelerometer based micro-electro-mechanical system.

15. The method of claim 12, wherein the identifying comprises identifying the second threshold value using the first vibration values.

16. The method of claim 15, wherein the identifying comprises determining the second threshold value based on match filtering of a raw histogram of the first vibration values.

17. The method of claim 12, further comprising:
   receiving data via satellite communication; and
   configuring parameters of the adaptive threshold component using the received data.

18. The method of claim 17, wherein the received data controls one or more qualification tests that determine whether the adaptive threshold component can update the first threshold value to the second threshold value.

19. The method of claim 18, wherein the received data enables or disables the one or more qualification tests.

20. The method of claim 18, further comprising transmitting, via satellite communication, information enabling indication of a failure of at least one of the one or more qualification tests.

* * * * *